June 27, 1939.　　M. H. GROVE　　2,163,597
FLUID FLOW REGULATOR
Filed Aug. 7, 1936　　3 Sheets-Sheet 2
FIG_2_
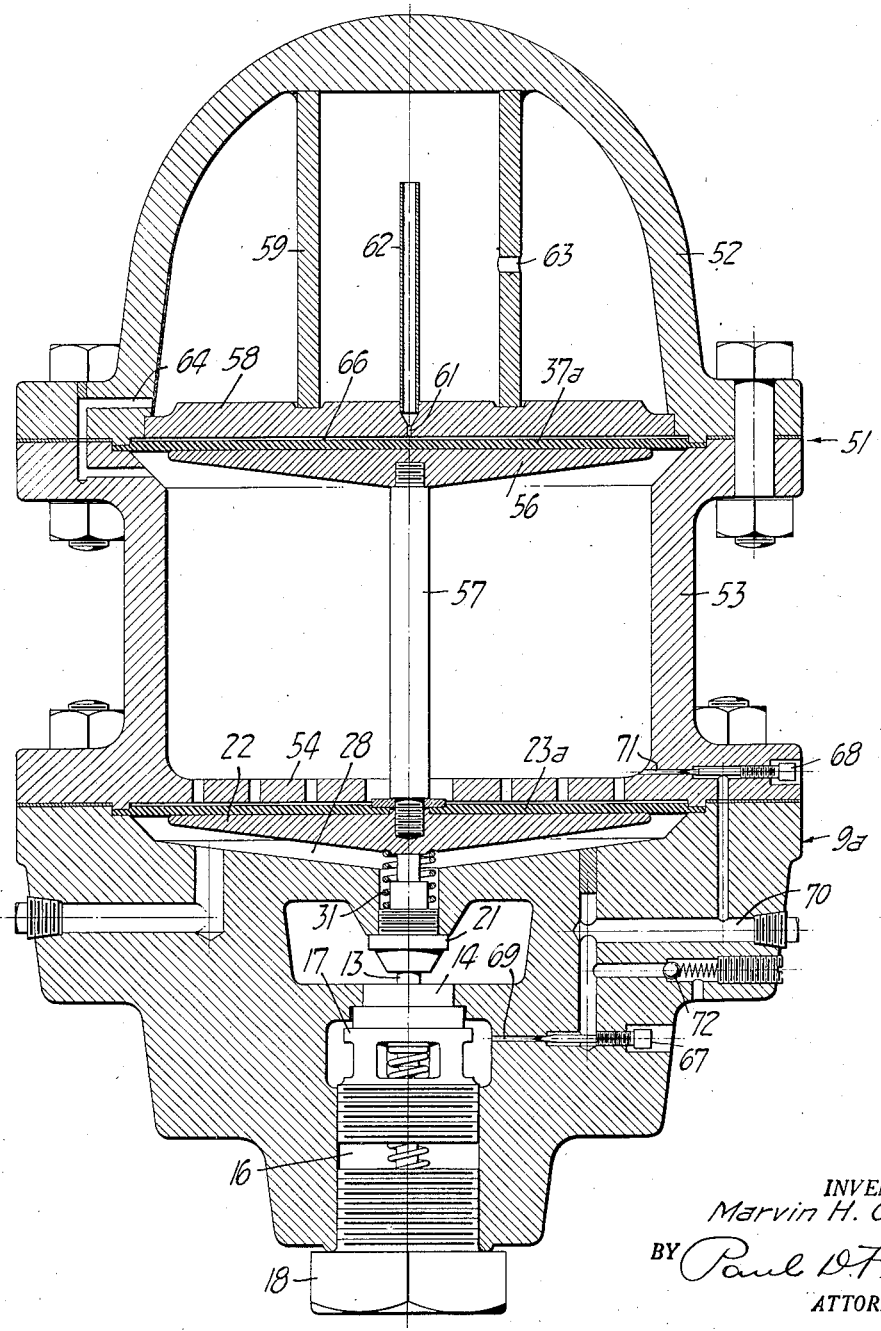
INVENTOR.
Marvin H. Grove
BY Paul D. Flehr
ATTORNEY

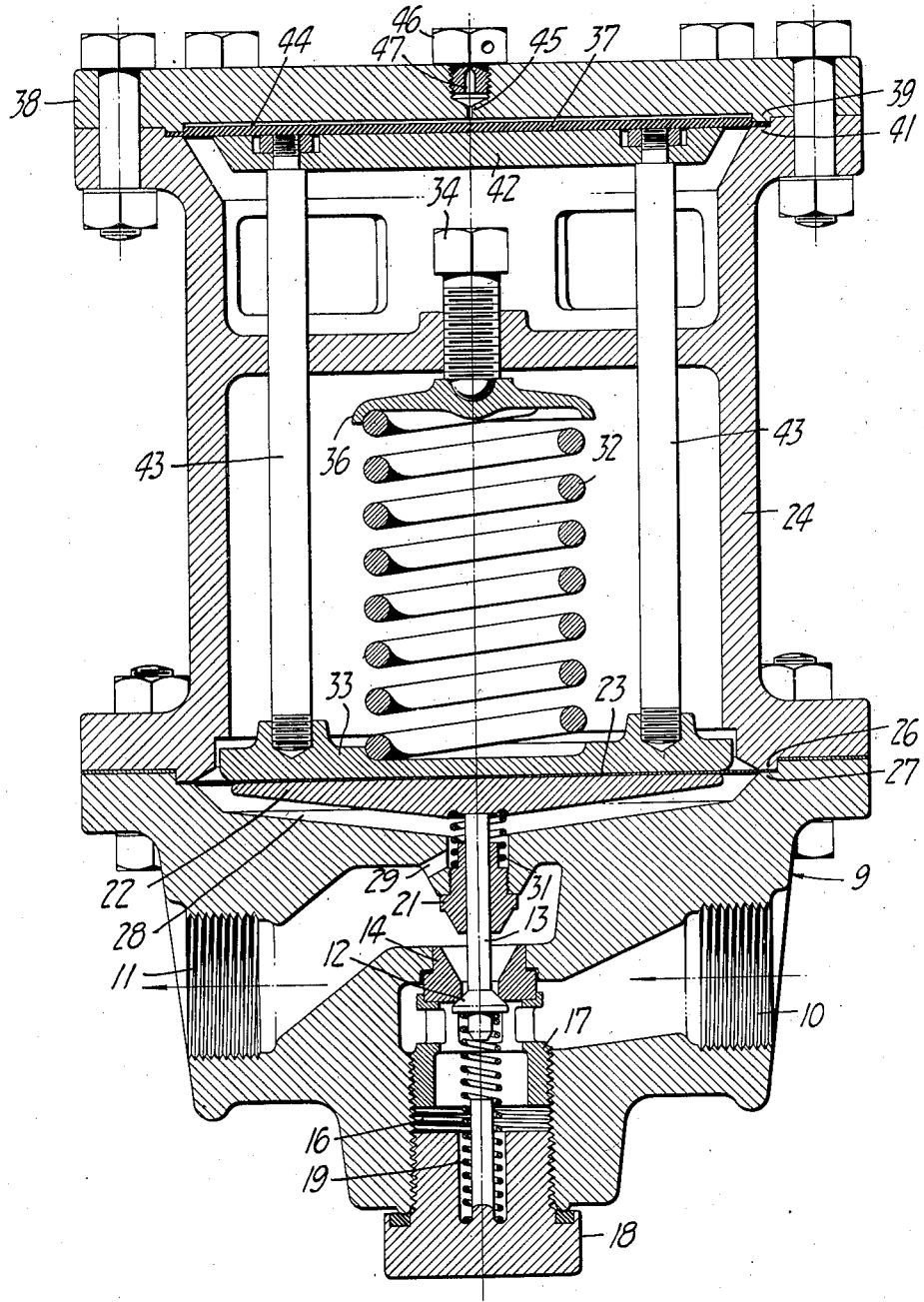

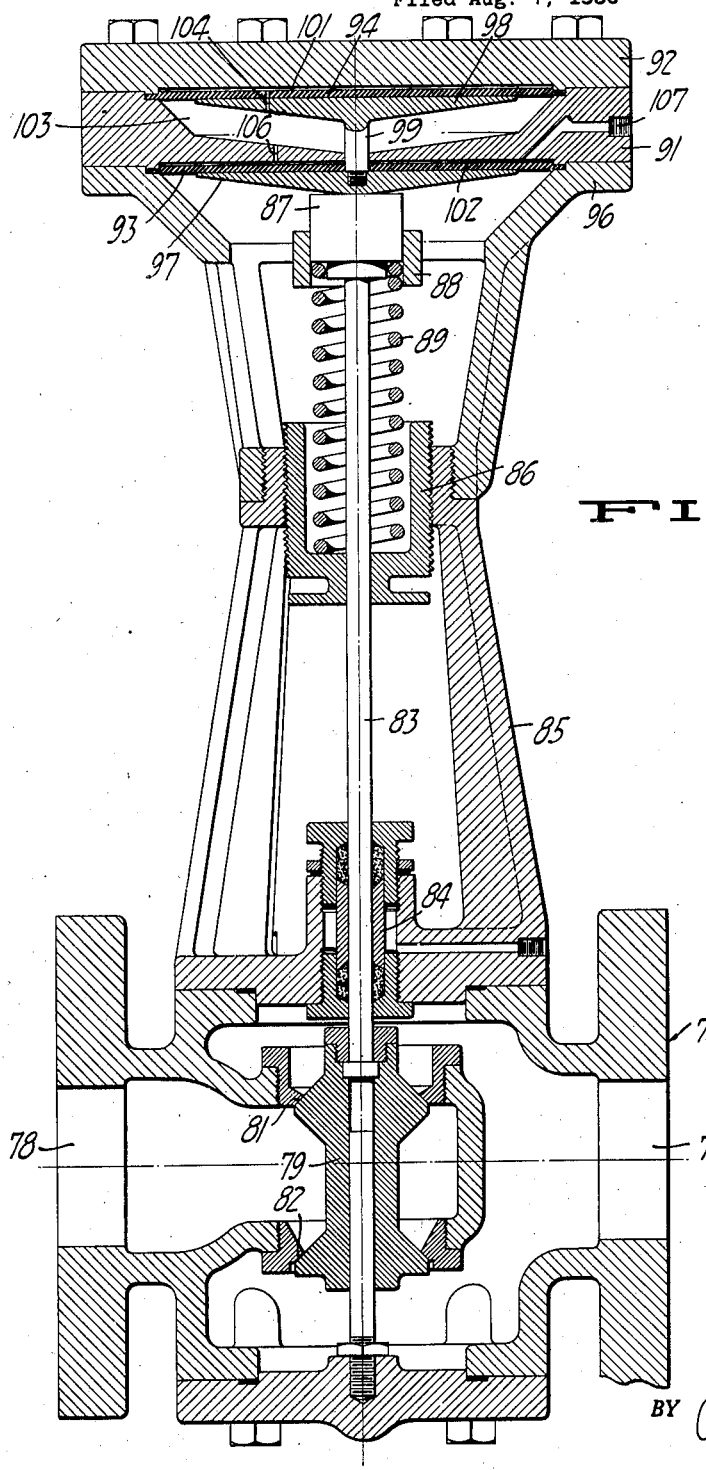

Patented June 27, 1939

2,163,597

UNITED STATES PATENT OFFICE 2,163,597

FLUID FLOW REGULATOR

Marvin H. Grove, Berkeley, Calif.

Application August 7, 1936, Serial No. 94,783

6 Claims. (Cl. 50—12)

This invention relates generally to devices for regulating or controlling flow of fluids. In a typical example, the invention is incorporated in a pressure regulator serving to supply fluid at a substantially constant pressure to a point of demand, from a relatively higher pressure source of fluid supply. In other instances the invention may constitute a flow control valve, controlled by varying fluid pressures applied from a remote point.

The present invention embodies features disclosed and claimed in my Patent No. 2,047,101, granted July 7th, 1936. The regulator as disclosed in said patent makes use of a working diaphragm, which actuates a flow regulating valve between open and closed positions. Means are provided for automatically imposing a restraint against abrupt opening movement of the valve member, without however imposing any comparable restraining forces when the valve member is in intermediate operating positions. The restraining means is in the form of a rigid wall extending across one face of the working diaphragm and in close proximity to the same, to form a confined fluid space. This fluid space is vented through a flow restricting orifice, whereby rarefaction of gas in the confined space imposes a restricting force of relatively high magnitude against initial abrupt opening movement of the valve member, thereby preventing slapping or chattering of the valve member upon its seat. For normal demands upon the regulator, when the valve member is in intermediate position, the regulator is sensitive to pressure variations, due to the fact that the restraining means does not materially dampen rapid hunting movements.

The present invention deviates from the embodiments disclosed in said Patent No. 2,047,101, in that while the restraining means has similar functions, it makes use of a supplemental diaphragm, other than the working diaphragm of the regulator. In certain types of service such an arrangement has advantages, as for example, where it is desired to bias the working diaphragm by means of a spring, or where it is desired to convert a regulator of more or less conventional design, to one using the invention disclosed and claimed in my Patent No. 2,047,101.

Further features and objects of the present invention will appear from the following description in which the preferred embodiments have been disclosed in detail, in conjunction with the accompanying drawings.

Referring to the drawings:

Fig. 1 is a side elevational view, in cross section illustrating a spring loaded regulator incorporating the present invention.

Fig. 2 is a side elevational view in cross section, illustrating another form of the invention, making use of trapped gas under pressure for loading the regulator.

Fig. 3 is a side elevational view, in cross section, illustrating a motor operated flow control valve, likewise incorporating the present invention.

The regulator illustrated in Fig. 1 consists of a body 9, having inflow and outflow openings 10 and 11. The inflow opening 10 is adapted to be connected to a source of gas under pressure, while the outflow opening 11 connects to a point of gas demand. To control flow of fluid through the body there is a movable valve member 12, carried by the valve stem 13. The body carries a seat ring 14, with which the valve member cooperates.

In order that the valve member and also the seat ring 14, may be readily removed from the regulator body, the body is shown provided with a threaded bore 16, concentric with the valve stem 13. Threaded within this bore there is a ported sleeve 17, which is adapted to engage and retain the seat ring 14. The bore 16 is normally closed by a cap 18, and interposed between this cap and the valve member 12 there is a relatively light compression spring 19.

The valve stem 13 is slidably guided within a bushing 21, and the upper end of the stem is adapted to engage a thrust plate 22, which is in the form of a relatively rigid disk. Disk 22 in turn engages one face of a flexible fluid operated diaphragm 23. To aid in mounting the diaphragm, and to serve other functions to be presently described, a flanged structure 24 is shown bolted to the upper side of the body 9, whereby the peripheral edge portion of the diaphragm is gripped between the annular shoulders 26 and 27. The body 9 is formed to afford a space 28 below the diaphragm 23, and this space is shown being in communication with the outflow side of the regulator, through duct 29. A light compression spring 31 is shown inserted between bushing 21 and thrust disk 22, whereby the upper face of this disk is always maintained in engagement with the lower face of the diaphragm.

The diaphragm 23 is loaded in this instance, by means of a compression spring 32. The lower end of this spring is shown seated upon a relatively rigid thrust disk 33, which in turn engages the upper face of diaphragm 23. Structure 24 carries a screw 34, or like adjustable member, the lower end of which engages a cap 36, which in turn serves as a seat for the upper end of spring 32. It will be evident that by changing the adjustment of screw 34, the tension of compression spring 32 can be varied, and the regulator adjusted for different pressures desired upon the outflow side.

The restraining means incorporated with the spring loaded regulator described above, makes use of a supplemental diaphragm 37. A rigid plate 38 overlies diaphragm 37, and is clamped to the structure 24, whereby annular shoulders 39 and 41 on these parts grip the peripheral edge portion of the diaphragm. Secured to the lower face of the diaphragm 37, there is a relatively rigid disk 42, which is connected to the lower thrust disk 33, by the rigid rods 43. The attachment between disc 42 and diaphragm 37 can be accomplished by a suitable expedient, as for example the diaphragm can be made of rubber, vulcanized directly to the surface of disk 42. The confined space 44, between the lower face of plate 38, and the upper face of diaphragm 37, is vented to the atmosphere through the flow restricting orifice 45. This orifice can be covered by a cap 46, which is shown provided with a port 47.

For closed position of the valve member 12 illustrated in Fig. 1, the space between diaphragm 37 and plate 38, or rather the clearance between the adjacent surfaces of these parts, constitutes only a minor fraction of the total travel of the valve member 12 between open and closed positions. For example good results are secured by utilizing a clearance of about $\frac{1}{32}$ of an inch, where the valve member has a travel of about $\frac{1}{4}$ of an inch. Likewise the orifice 45 should be of relatively small diameter, to properly impede flow of air from the atmosphere into and out of the space 44. For example good results are secured where the orifice 45 has a diameter of about 0.052 inch or less, with the diaphragm 37 having a diameter in the neighborhood of 7 inches.

The regulator described above functions as follows:—Assuming that the inflow opening 10 is connected to a source of gas under pressure, the pressure of gas delivered to the outflow side, will depend upon the force exerted by the spring 32. When the pressure on the outflow side is above a desired predetermined value, such pressure is transmitted to the chamber 28, and presses upon this diaphragm 23 with sufficient force to retain the valve member 12 in closed position. Assuming that the pressure upon the outflow side is suddenly reduced, as by suddenly opening a valve connected with the low pressure system, reduction of pressure in chamber 28 permits spring 32 to force the diaphragm 23 downwardly, to open the valve member 12. In conventional regulators operating under such conditions, there is a tendency for the valve member 12 to jump open too far from its seat, with the result that a surge of gas passes through the regulator. Such surges of gas are to be avoided, not only because they cause too wide a variation on the outflow side of the regulator, but also because they tend to cause the valve member 12 to chatter or pound upon its seat. In the present invention such abrupt opening of the valve member 12 is retarded by virtue of the retaining action imposed by diaphragm 37. When diaphragm 23 flexes downwardly under the urge of compression spring 32, such movement is necessarily accompanied by a downwardly flexing movement of the diaphragm 37. Abrupt downward movement of diaphragm 37 from the point of its close proximity to the lower face of plate 38, causes rarefaction of air of space 44, with the result that the atmospheric pressure on the lower side of the diaphragm 37 immediately opposes the downward force of the spring 32. Thus the valve member 12 will not move open too far from its seat, and under no conditions will it slap or chatter upon its seat. During time when a fair demand is placed upon the regulator, it is evident that valve member 12 will take an intermediate position between open and closed positions, and will tend to hunt in response to variations of pressure upon both the inflow and outflow sides. Diaphragm 37 will not exert any serious restraint against such hunting movements, comparable to the initial restraint placed against abrupt opening movement of the valve member from its seat, due to the fact that when the valve member is in intermediate positions, the space 44 is of greatly enlarged volume. Thus sensitivity of the valve in responding to pressure variations, is retained, while inherent defects of conventional regulators, are avoided.

The pressure regulator of Fig. 2 is similar to that of Fig. 1, except that in this instance trapped gas under pressure is utilized to load the working diaphragm, in place of a compression spring. The body 9a is provided with inflow and outflow openings, as in Fig. 1, and with comparable valve means for controlling flow of fluid. Mounted upon the body 9a, there is a dome 51, which can be conveniently formed of two sections 52 and 53. The main working diaphragm 23a has its peripheral edge portion gripped between body 9a, and the lower portion of dome 53. The space 28 below this diaphragm is in communication with the outflow side of the regulator, the same as in Fig. 1. In order to protect the diaphragm 23a against too great an amount of flexing in one direction, a rigid perforate wall 54, extends over the upper side of the diaphragm, and is carried by the lower portion of dome section 53. Disposed above the flexible diaphragm 23a, there is a second flexible diaphragm 37a, which has its peripheral edge portion clamped between the dome sections 52 and 53. A rigid disk 56 is secured to the lower face of diaphragm 37a, and is rigidly connected to the corresponding disc 22 underlying diaphragm 23a, by the rod 57.

Overlying the second diaphragm 37a, there is a rigid wall or plate 58, which is secured to the lower face of the dome section 52. Wall 58 is reinforced by a tubular strut 59, which extends to the top of the dome section 52. It is also provided with a restricted flow orifice 61, which communicates with the interior of the upper dome section 52 through the stand pipe 62. The interior of the tubular strut 59 is in communication with the remainder of the dome, through one or more openings 63. Likewise the interior of the upper dome 52 is in relatively unrestricted communication with the interior of the lower dome section 53, through ducts 64. The restricted space 66, formed between diaphragm 37a and the wall 58, is comparable to the space 44 of Fig. 1.

Means are provided for the purpose of admitting gas under pressure into the dome 51, or for venting gas from this dome, whereby the loading of the diaphragm 23a can be varied. This means makes use of a pair of check valves 67 and 68, substantially as disclosed in the aforesaid Patent No. 2,047,101. When both these needle valves are open, gas is admitted into the dome from the inflow side of the regulator, through ducts 69, 70 and 71. If one attempts to introduce too high a pressure into the dome, pressure is vented through the escapement valve 72.

The regulator functions substantially the same as that previously described with reference to Fig. 1. Trapped gas pressure into the dome 52 is equalized upon both sides of the secondary diaphragm 37a. Diaphragm 23a is a working diaphragm which primarily controls the positioning of the valve member. Secondary diaphragm 37a in conjunction with the confined space 66, exerts restraining forces upon the diaphragm 23a, to avoid undesired abrupt opening movement of the valve member and to avoid slapping and chattering of the valve member upon its seat. During normal operation of the regulator of Fig. 2, with reasonable amount of demand on the outflow side, there is a negligible amount of damping to rapid hunting movements of the valve member, due to the fact that this regulator is loaded by gas under pressure, instead of a spring of considerable weight.

The flow regulator or control valve of Fig. 3 is adapted to be operated in accordance with pressure variations from a remote point. It consists of a valve body 76, having reversible inflow and outflow openings 77 and 78. A valve member 79 of the balanced type, cooperates with a pair of seats 81 and 82. The balanced valve member is carried by an operating stem 83, which extends through a suitable packing gland 84. A structure 85 is carried by the body, and is provided with a guide bushing 86 for the stem 83. Above the bushing 86 the stem 83 is shown secured to an enlarged head or plunger 87, which is slidable within the guide sleeve 88. Interposed between the plunger 87 and the bushing 86, there is a compression spring 89, whereby the valve member 79 is biased towards closed position.

Mounted upon the upper end of structure 85, there is a hollow body 91, upon which in turn is mounted a top plate 92. Associated with these parts are the two flexible diaphragms 93 and 94. Diaphragm 93 has its peripheral edge portion clamped between the flange 96 formed on the upper end of structure 85, and the hollow body 91. Diaphragm 94 has its peripheral edge portion clamped between body 91 and the top plate 92. The lower face of diaphragm 93 is engaged by thrust disk 97, the central portion of which in turn abuts the plunger 87. The lower side of diaphragm 94 is secured to a similar thrust disk 98, which is connected by the pin 99, to the disk 97. When the valve member 79 is in closed position, there is a relatively restricted space 101 between diaphragm 94 and the lower face of plate 92. this space being comparable to the space 44 of Fig. 1. Likewise there is a similar restricted space 102 between the lower face of body 91 and the upper face of diaphragm 93. Immediately below the diaphragm 94 there is a relatively enlarged space 103, which is in communication with space 101 through the flow restricting orifice 104, which is also in communication with the restricted space 102, through the flow restricting orifice 106. Controlling gas pressures, from a remote point, are applied to the duct 107, which is in communication with the restricted space 102.

The controlling or regulating device of Fig. 3 operates as follows:—When only atmospheric pressure is imposed upon the duct 102, the valve 79 remains in closed position. However, when pressure is applied to duct 107, it is immediately impressed upon the upper surface of diaphragm 93, and to cause this diaphragm to flex downwardly to move the valve member 79 to open position. However, movement of the valve member from its seat cannot occur abruptly, due to the attenuation or rarefication of gas pressure in the restricted space 101. However, once the valve member has been moved clear of its seat it can be opened more widely at a more rapid rate, due to the fact that for intermediate positions of the valve member 79, the restricted space 101 is of greatly increased volume. Conversely when pressure applied to duct 107 is reduced, as by venting the same, valve member 79 can move fairly rapidly to closed position, except however that final closing movement is cushioned to prevent too abrupt closing.

I claim:

1. In a device of the character described, a body having an inflow opening adapted to be connected to a source of gas under pressure and also having an outflow opening for connection to a point of gas demand, a valve member cooperating with a valve seat in the body and movable in opposite directions between open and closed positions, and serving to control flow of fluid through the body, a movable fluid pressure operated member connected to the valve member, means for impressing varying fluid pressure on said member to urge said member in one direction, means for biasing said fluid operated member in an opposite direction, and means including a supplemental movable member serving to impose a restraint against abrupt movement of the valve member in the immediate proximity of its seat, without imposing a comparable restraint against like abrupt movement of the valve member from intermediate positions of the same.

2. In a pressure regulator, a body having an inflow opening adapted to be connected to a source of gas under pressure and also having an outflow opening for connection to a point of gas demand, a valve member movable within the body in opposite directions between open and closed positions, said valve member serving to regulate flow of fluid through the body, a movable fluid pressure operated member connected to the valve member, means for impressing fluid pressure on said member from the outflow side of the regulator, to urge said member in a direction to close the valve member in response to an increase in pressure on the outflow side, means for biasing said fluid operated member in an opposite direction, and means including a diaphragm supplemental to said fluid operated member, for imposing a restraint against abrupt movement of the valve member in the immediate proximity of its seat, without imposing a comparable restraint against like abrupt movement of the valve member from intermediate positions of the same.

3. In a pressure regulator, a body having an inflow opening adapted to be connected to a source of gas under pressure and also having an outflow opening for connection to a point of gas demand, a valve member within the body movable in opposite directions between open and closed positions, a fluid or pressure operated member connected to the valve member, means for impressing fluid pressure on said fluid operated member from the outflow side of the regulator, to urge said member in a direction to close the valve member in response to an increase in pressure on the outflow side, means for biasing said fluid operated member in an opposite direction, and means serving to impose a restraint against abrupt movement of the valve member in the immediate proximity of its seat, without imposing a comparable restraint against like abrupt movement of the valve member from intermediate positions of the same, said last means including a flexible diaphragm in addition to said fluid operated member, a relatively rigid wall extending across one face of said diaphragm and serving to form a confined fluid space between one face of the diaphragm and said wall, a motion transmitting connection between said fluid operated member and said daphragm, whereby when said valve member moves in a direction away from its seat said diaphragm is flexed in a direction away from said wall, and an orifice serving to vent said space and serving to materially impede fluid flow into the same.

4. In a pressure regulator, a body having an inflow opening adapted to be connected to a source of gas under pressure and also having an outflow opening for connection to a point of gas demand, a valve member within the body movable in opposite directions between open and closed positions, a fluid or pressure operated member connected to the valve member, means for impressing fluid pressure on said fluid operated member from the outflow side of the regulator, to urge said member in a direction to close the valve member in response to an increase in outflow pressure, means for biasing said fluid operated member in an opposite direction, and means serving to impose a restraint against abrupt movement of the valve member in the immediate proximity of its seat, without imposing a comparable restraint against like abrupt movement of the valve member from intermediate positions of the same, said last means including a flexible diaphragm in addition to said fluid operated member, a relatively rigid wall extending across one face of said diaphragm and serving to form a confined fluid space between one face of the diaphragm and said wall, a motion transmitting connection between said fluid operated member and said diaphragm, whereby when said valve member moves in a direction away from its seat said diaphragm is flexed in a direction away from said wall, and an orifice serving to vent said space and serving to materially impede fluid flow into the same, the clearance between the adjacent faces of the diaphragm and said wall, when the valve member is in closed position, being a minor fraction of the travel of the valve member between closed and open positions.

5. In a pressure regulator, a body having an inflow opening adapted to be connected to a source of gas under pressure and also having an outflow opening for connection to a point of relatively lower pressure gas demand, a valve member within the body movable in opposite directions between open and closed positions, said valve member cooperating with a seat and serving to control flow of fluid to the body, a movable fluid pressure operated member connected to the valve member, means for impressing fluid pressure on said member from the outflow side of the regulator, to urge said member in a direction to close the valve member in response to an increase in the outlet member pressure, spring means for biasing said member pressure, in an opposite direction, a flexible diaphragm in addition to said fluid operated member, means forming a motion transmitting connection between said diaphragm and said fluid operated member, whereby said diaphragm is caused to flex in opposite directions when said valve member is moved between open and closed positions, a relatively rigid wall extending across one face of said diaphragm and substantially parallel to the same, said wall being sealed with respect to the peripheral edge portion of the diaphragm, whereby a confined fluid space is formed between one face of the diaphragm and the adjacent surface of said wall, the clearance between said diaphragm and the adjacent face of said wall being a minor fraction of the travel of the valve member between open and closed positions, when the valve member is in closed position, and a restricted orifice serving to vent said space, said orifice serving to materially impede flow of fluid into said space when said diaphragm is initially flexed away from said wall, responsive to opening movement of the valve member.

6. In a flow regulating device, a body having an inflow opening adapted to be connected to a source of gas under pressure and also having an outflow opening for discharge of gas, a valve member within the body movable in opposite directions between open and closed positions to control flow of fluid through the same, a flexible diaphragm connected to said valve member, means forming a gas chamber upon one side of the diaphragm, said gas chamber being adapted to communicate with a source of gas varying pressure, a second flexible diaphragm connected to the first diaphragm, whereby flexing of the first diaphragm also causes simultaneous flexing of the second diaphragm, means forming enclosed gas chambers upon both sides of said second diaphragm, said space being in restricted communication with one of said chambers, and said one chamber being in restricted communication with the other one of said chambers.

MARVIN H. GROVE.